Patented Sept. 20, 1949

2,482,172

UNITED STATES PATENT OFFICE 2,482,172

PROCESS FOR PREPARING PHTHALOCYANINES CONTAINING TERNARY SULFONIUM SALT GROUPS

Norman Hulton Haddock and Clifford Wood, Manchester, England, assignors to Imperial Chemical Industries Limited, a corporation of Great Britain No Drawing. Application November 18, 1947, Serial No. 786,790. In Great Britain November 22, 1946

5 Claims. (Cl. 260—314.5)

This invention relates to the manufacture of process for preparing phthalocyanines containing ternary sulphonium salt groups and more particularly to phthalocyanine derivatives which contain ternary salt groups, being a modification and/or improvement of the process of our U. S. Patent No. 2,464,806.

In our U. S. Patent No. 2,464,806 there is described a process for the manufacture of new water-soluble phthalocyanine derivatives which comprises treating a phthalocyanine containing at least two chloro- or bromo- methyl groups by methods known to be capable of replacing the chlorine or bromine atoms of chloro- or bromomethyl groups by quaternary or ternary salt groups. As an example of a known method for replacing the chlorine or bromine atoms by sulphonium groups there is described the reaction of the chloro- or bromo- methyl derivative with an alkali metal derivative of a mercaptan and then treating the so-obtained sulphide with such an ester as is known to convert sulphides into ternary sulphonium salts. As an example of a known method for replacing the chlorine or bromine atoms by isothiouronium groups there is described the reaction of the chloro- or bromo- methyl derivative with a thiourea containing at least one hydrogen atom directly attached to nitrogen. A process is also described for preparing compounds containing salt groups by reacting the chloro- or bromo- methyl derivative with thioureas containing no free hydrogen atoms directly attached to nitrogen for example tetramethylthiourea.

We have now found that the phthalocyanine derivatives containing sulphonium groups described in U. S. Patent No. 2,464,806 may be made by reacting the chloro- or bromo- methyl derivatives with a thiourea to replace the chlorine or bromine atoms by salt groups as described in U. S. Patent No. 2,464,806, hydrolysing the salt groups with alkali to give alkali metal mercaptide groups, alkylating to give alkylmercaptomethyl groups and then reacting with an ester.

According to our invention therefore we provide a process for the manufacture of water-soluble phthalocyanine derivatives which comprises reacting with thiourea or a substituted thiourea, a phthalocyanine containing at least two chloro- or bromo- methyl groups, hydrolysing the product with alkali to replace the salt groups by alkali metal mercaptide groups, alkylating, and subsequently reacting the so-obtained phthalocyanine derivative containing at least two alkylmercaptomethyl groups with such an ester as is known to convert organic sulphides into ternary sulphonium salts.

Suitable phthalocyanine derivatives for use in the process of the invention include, for example, copper tri-(chloromethyl) phthalocyanine, copper tetra-(chloromethyl) phthalocyanine, tri-(chloromethyl) phthalocyanine, copper tri-(chloromethyl) -octa -3:6 - chlorophalocyanine, copper tetra-(chloromethyl) -tetra -4 - benzoylphthalocyanine and copper tri-(bromomethyl) -phthalocyanine.

As examples of suitable substituted thioureas there may be mentioned N-methylthiourea, tetramethylthiourea, N-o-tolylthiourea, N-phenylthiourea and N:N:N'-trimethylthiourea.

The reaction between the phthalocyanine derivative containing at least two chloro- or bromomethyl groups and the thiourea or substituted thiourea may be brought about for example by heating the reagents together in aqueous medium and the product may be hydrolysed by heating it with, for example, aqueous caustic soda solution.

The phthalocyanine derivative so-obtained containing at least two alkali metal mercaptide groups may be alkylated by treating it with an alkyl halide or sulphate such as for example ethyl chloride or dimethylsulphate or with a substituted alkyl halide or sulphate for example benzyl chloride.

By an ester which is known to convert organic sulphides into ternary sulphonium salts we mean an ester which is actually used for this purpose or is mentioned in the literature as suitable for this purpose. As examples of such esters there may be mentioned dimethylsulphate or methyl p-toluenesulphonate.

The products of the invention are soluble in water giving bright blue or green solutions from which cotton or other textile material is dyed in bright blue or green shades of very good fastness to washing treatments and to light. In the case of some of the new phthalocyanine derivatives it is advantageous to assist solution in water for example by addition of suitable surface tension reducing agents. We have found that condensation products of β-naphthol and ethylene oxide are particularly suitable for this purpose. It is a further feature of the invention to use these quaternary and ternary salts as dyestuffs.

The invention is illustrated but not limited by the following examples in which parts are by weight.

*Example 1*

24 parts of copper tri-(chloromethyl) phthalocyanine, 45.6 parts of thiourea and 80 parts of water are stirred together at 95° C. for 15 minutes. 200 parts of water and then 30 parts of salt are added. The isothiouronium salt which is precipitated as a dark blue solid is filtered off and washed with 5% salt solution.

The moist filter-cake is transferred to a closed vessel and the air in the vessel is then displaced by nitrogen. A solution of 20 parts of caustic soda in 185 parts of water is added with stirring and the mixture is heated to 90° C. and then cooled. 140 parts of ethanol are added to the resulting dark green suspension, and 50.7 parts of dimethyl sulphate are gradually added at 30–40° C. The colour of the suspension changes from dark green to bright blue. When the addition of dimethyl sulphate is complete, the mixture is heated to 70° C. and the blue solid is filtered off and washed well with water, and dried at 80–100° C. A bright blue powder is obtained, which consists of copper tri-(methylmercaptomethyl)-phthalocyanine.

20 parts of copper tri-(methylmercaptomethyl) phthalocyanine and 80 parts of dimethyl sulphate are heated together at 80–85° C. for 10 minutes. The mixture so obtained is cooled and diluted with 100 parts of acetone, and the suspended dark blue solid is filtered off, washed with acetone and dried at 60° C. A blue powder is obtained which dissolves readily in water and the solution dyes cotton in bright blue shades having excellent fastness to washing and to light.

*Example 2*

In place of the 24 parts of copper tri-(chloromethyl) phthalocyanine employed in Example 1 there are used 24 parts of metal-free tri-(chloromethyl) phthalocyanine. The product is a greenish blue powder which dissolves in water to give a greenish blue solution. The solution dyes cotton in bright greenish blue shades having good fastness to washing and to light.

*Example 3*

36 parts of the tetramethylthiourea salt of copper tri-(chloromethyl) phthalocyanine, made as described in Example 2 of U. S. Patent No. 2,464,806, are dissolved in 400 parts of water in a closed vessel. The air is displaced by means of nitrogen and 30 parts of caustic soda are added. The mixture is heated to 90° C. and then cooled. 100 parts of ethanol are added and then 50.7 parts of dimethyl sulphate are gradually added at 30–40° C. The colour of the suspension changes from green to blue during the addition. The mixture is heated to 70° C. and the blue solid is filtered off, washed well with water and dried at 80–100° C. A bright blue powder is obtained, which consists of copper tri-(methylmercaptomethyl) phthalocyanine. This material, on treatment with dimethylsulphate in the manner described in the last paragraph of Example 1, gives a similar dyestuff to that described in Example 1.

*Example 4*

24 parts of copper tri-(chloromethyl) phthalocyanine, 45.6 parts of thiourea and 80 parts of water are stirred together at 95° C. for 15 minutes. 200 parts of water and then 30 parts of salt are added. The isothiouronium salt which is precipitated as a dark blue solid is filtered off and washed with 5% salt solution.

The moist filter cake is transferred to a closed vessel and the air in the vessel is then displaced by nitrogen. A solution of 20 parts of caustic soda in 185 parts of water is added with stirring and the mixture is heated to 90° C. and then cooled. 50 parts of benzyl chloride are added at 30–40° C. The colour of the suspension changes from dark green to bright blue. When the addition of benzyl chloride is complete, the mixture is heated to 70° C. and the blue solid is filtered off and washed well with water, and dried at 80–100° C. A bright blue powder is obtained which consists essentially of copper tri-(benzylmercaptomethyl) phthalocyanine.

20 parts of copper tri-(benzylmercaptomethyl) phthalocyanine, 30 parts of dimethyl sulphate and 30 parts of β-ethoxyethanol are heated together at 110–120° C. for 30 minutes. The mixture so obtained is cooled and diluted with 100 parts of acetone, and the suspended dark blue solid is filtered off, washed with acetone and dried at 60° C. A blue powder is obtained which dissolves readily in water, and the solution so obtained dyes cotton in bright blue shades.

*Example 5*

24 parts of copper tri-chloromethyl phthalocyanine, 100 parts of o-tolylthiourea and 100 parts of β-hydroxyethanol are heated together at 95–100° C. for 30 minutes. 200 parts of acetone are added and the precipitated blue solid is filtered off and washed with acetone and then with 5% salt solution.

The moist filter-cake is transferred to a closed vessel and treated with caustic soda and dimethyl sulphate in the manner described in the second paragraph of Example 1. A bright blue powder, consisting essentially of copper tri-(methylmercaptomethyl) phthalocyanine, is obtained. This is heated with dimethyl sulphate in the manner described in the last paragraph of Example 1. The product is similar to that described in Example 1.

We claim:

1. In process for the manufacture of water-soluble phthalocyanine derivatives containing ternary sulphonium salt groups, the steps which comprise hydrolysing in an aqueous solution of an alkali metal hydroxide, a compound of the formula R(CH₂X)ₙ, wherein R is the radical of a phthalocyanine compound formed by removing $n$ atoms of hydrogen from the molecule, $n$ is an interger greater than 1 and X is an isothiouronium salt group, and alkylating the resulting alkali metal mercaptide to give a compound of the formula R(CH₂SAlk)ₙ, wherein Alk is an alkyl group and R and $n$ have the significance given above.

2. A process as claimed in claim 1 wherein R is the radical of a copper phthalocyanine.

3. A process as claimed in claim 2 wherein $n$ is 3.

4. A process as claimed in claim 1 wherein X is the radical:

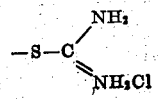

5. A process as claimed in claim 4 wherein the aqueous solution of an alkali metal hydroxide is an aqueous solution of sodium hydroxide.

NORMAN HULTON HADDOCK.
CLIFFORD WOOD.

REFERENCES CITED

The following references are of record in the file of this patent:

UNITED STATES PATENTS

| Number | Name | Date |
|---|---|---|
| 2,290,906 | Coffey et al. | July 28, 1942 |

FOREIGN PATENTS

| Number | Country | Date |
|---|---|---|
| 587,636 | Great Britain | May 1, 1947 |